United States Patent [19]
Ohlson

[11] Patent Number: 5,927,806
[45] Date of Patent: Jul. 27, 1999

[54] INFANT CARRIER FOR TROLLEYS

[76] Inventor: Karl-Gunnar Ohlson, Hoffs väg 8, S-670 40 Åmotfors, Sweden

[21] Appl. No.: 08/952,477

[22] PCT Filed: May 30, 1996

[86] PCT No.: PCT/SE96/00692

§ 371 Date: Nov. 21, 1997

§ 102(e) Date: Nov. 21, 1997

[87] PCT Pub. No.: WO96/38332

PCT Pub. Date: Dec. 5, 1996

[30] Foreign Application Priority Data

May 30, 1995 [SE] Sweden ................................. 9501970

[51] Int. Cl.$^6$ ...................................................... A47C 1/08
[52] U.S. Cl. ................................ 297/256.17; 297/256.13
[58] Field of Search ............................ 297/256.17, 250.1, 297/256.13, 410, 391, 183.1, 183.6, 452.25, 452.24, 452.23, 452.34, 452.36; 224/411

[56] References Cited

U.S. PATENT DOCUMENTS

| | | |
|---|---|---|
| 3,351,380 | 11/1967 | Sprague . |
| 4,607,886 | 8/1986 | Mazhar ................................. 297/410 |
| 4,711,492 | 12/1987 | Asbjornsen et al. . |
| 4,861,105 | 8/1989 | Merten et al. . |
| 5,056,865 | 10/1991 | Sedlack . |
| 5,201,535 | 4/1993 | Kato et al. ........................ 297/183.6 X |
| 5,277,473 | 1/1994 | Kelly et al. . |
| 5,370,441 | 12/1994 | Chuang ................................. 297/250.1 |

FOREIGN PATENT DOCUMENTS

| | | |
|---|---|---|
| 1213510 | 11/1986 | Canada . |
| 2275895 | 9/1994 | United Kingdom . |

*Primary Examiner*—Milton Nelson, Jr.
*Attorney, Agent, or Firm*—Nixon & Vanderhye

[57] ABSTRACT

A carrier for a child seat on a trolley is provided having a seat surface with a front edge, a backrest adjoining a rear edge of the seat surface, at an angle thereto, and having a rear side, two side surfaces adjoining at least one of the seat surface and backrest, at least one securing arrangement mounted on the carrier and projecting outside a plane parallel to the rear side of the backrest, and a leg support attached to the front edge of the seat surface which leg support acts as a support for a child's legs and which leg support is at an angle to the seat surface. The leg support has a width adapted to an aperture in a trolley in front of the child seat, so that the carrier can be attached to a trolley with a child seat optionally in two positions, namely one where the carrier is placed down on the child seat of the trolley wherein the leg support is arranged through the aperture while the securing arrangement is in engagement with a back support of the child seat; and a second position where the carrier rests against a pushbar of the trolley and the back support of the child seat while the securing arrangement is in engagement with the back support of the child seat.

14 Claims, 4 Drawing Sheets

INFANT CARRIER FOR TROLLEYS

TECHNICAL FIELD

The present invention relates to a carrier for child seats on trolleys, comprising a seat surface, a backrest adjoining the rear edge of the seat surface, at an angle thereto, two side surfaces adjoining at least one of the said seat surface and backrest, and at least one securing means arranged on the carrier and projecting outside a plane parallel to the rear side of the backrest.

BACKGROUND OF THE INVENTION

A large number of trolleys in convenience stores have a horizontal pushbar which is arranged transverse to the trolley and in front of and above a child seat which can be opened out and closed and which faces the customer, the said child seat consisting of an openworked wire back support and a seat panel, with one or more vertical wire bars at the front edge of the seat panel which prevent the child from sliding forwards and off the child seat. It is only at the age of about 10 to 15 months that a child can be placed safely and securely in these child seats without additional support. Long before this, however, many mothers or child supervisors need to be able to take the child with them when they go shopping on their own. Many go shopping with babies who are only a few weeks old. At that age, and up to about 6 to 8 months old, infants need support for the whole back and the head, and it is also preferable to lay them in a more or less reclining position. This has its problems.

For this purpose, there are essentially two types of chair available on the market: on the one hand, a child car chair which is relatively expensive for the customer and which, after it has been removed from the car, can be temporarily secured, with the child in a semi-recumbent position, on top of the child seat on some trolleys, and, on the other hand, an earlier, simpler and dedicated child chair which is intended to be mounted permanently on top of a trolley and which then offers the child a position which has been predetermined by the shop. Trolleys with this arrangement cannot be locked together with other trolleys in trolley stands using conventional trolley locks, and they need to be parked in their own parking line and so require considerably more parking space per trolley. For infants in their very first months, it is also possible to hire baby chairs for cars which, when they have been released from the safety belts in the car, can be placed, with the infant in them, down in the goods basket of the trolley, but these chairs then take up most of the space available for shopping items in the trolley.

DESCRIPTION OF THE INVENTION

The object of the invention is that shops shall be able to offer, to those customers who have very young children, and even babies, with them when shopping, a comfortable and safe method, which is acceptable to everyone concerned, of transporting the child in the shop's trolleys, without these trolleys being equipped permanently with an infant carrier and thus probably entailing a larger number of trolleys and greater investment in the trolley stock, and, in addition, requiring their own parking line.

According to one aspect of the invention, a carrier is made available for transporting children, under the age of about 2 years, either in a reclining or sitting position, over or, respectively, down on the child seats of trolleys. The carrier consists of a leg support for the child's legs, which support is angled downwards from a seat surface, and of a backrest which is angled upwards from this seat surface. On each side of the carrier there are also side surfaces.

According to one aspect of the invention, the leg support is designed in the form of two separate leg tongues when the child seat of the trolley is designed with a fixed fork bar. Because the supports of the carrier for the child's legs, i.e. the leg tongues, are designed divided along their entire length, the carrier can be used for both a reclining position, and a sitting position of the child in those trolleys having one or more fork bars at the front edge of the seat panel.

The leg tongues are joined only via the front edge of the seat surface or additionally by a tab projecting from the front edge of the seat surface. With the carrier in the sitting position, the tab drops fully or partly in between two fork bars.

In the reclining position, the leg tongues rest against the trolley's pushbar and/or the front upper edge of the goods basket, and in the sitting position they rest against the front edge of the seat panel.

On the carrier there are securing means which reach down below the underside of the backrest. On the securing means there are rearvardly directed tongues. In the sitting position, the lower edges of the securing means bear against the upper edge of the back support, or against a back-support crossbar parallel to this upper edge, and the tongues prevent the carrier from shifting sideways.

The securing means comprise a detachable or pivotable bearing module which, when the carrier is in the reclining position, raises the carrier's backrest so that it does not lie against the upper edge of the back support or on any elevated parts which may be present thereon, and prevents the carrier from sliding off the upper edge of the back support.

The lower edge of the bearing modules is designed with one or more indents and with flaps surrounding them. In the reclining position, one indent rests against the upper edge of the back support so that at least one flap is situated above behind the upper edge of the back support and at least one flap is situated below the upper edge of the back support and in front of/behind the side bars of the back support.

On the upper edge of each of the side surfaces there are two attachments for flexible carrier straps which serve as lifting and carrying handles when the carrier with the child is to be lifted into the reclining position over the child seat or lifted down into the sitting position.

Because the child in the carrier can be lifted using only one hand, the other hand is free for maneuvering the child's feet and legs, resting in the leg tongues, down under the pushbar of the trolley and the front upper edge of the goods basket when the carrier is in the sitting position. This makes it considerably easier to place small children in the child seats of trolleys before the child has learnt to pass his or her feet through the openings in the child seat at the front edge of the seating panel.

Further aspects and advantages of the present invention will be evident from the detailed description of a preferred embodiment and from the patent claims which follow.

BRIEF DESCRIPTION OF THE FIGURES

In the following description of a preferred embodiment, reference will be made to the attached drawings, in which.

DETAILED DESCRIPTION OF A PREFERRED EMBODIMENT

Figure 1:
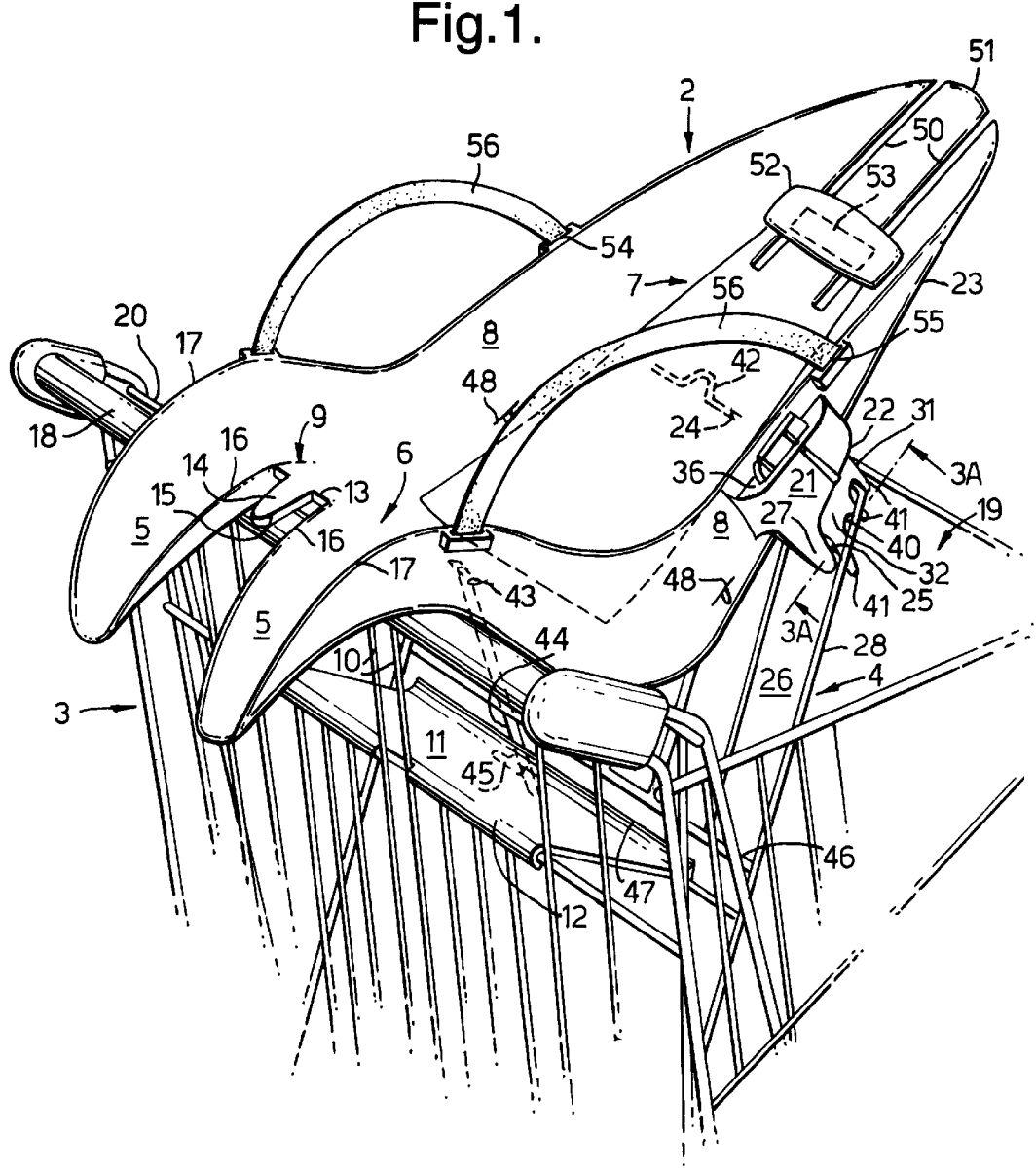
FIG. 1 is a perspective sketch of the invention placed and fastened in the reclining position above the child seat of a trolley.

The arrangement according to the invention is a carrier 2 in which children under the age of two years can be transported either reclining (FIG. 1) or sitting (FIG. 2) by virtue of a side-stabilized, and, in the reclining position (FIG. 1), downwardly fastened and thus safe and secure positioning of the carrier 2 over or, respectively, down on the child seat(s) 4 of a trolley 3 or of several different trolley models. In the embodiment shown, the carrier 2 comprises two leg tongues 5 which are separate from one another and which are the same length as or longer than a baby's legs and are adjoined to a seat surface 6, which is adjoined at the rear to a backrest 7 angled upwards from this seat surface 6, and also two side surfaces 8 which are angled upwards in relation to the leg tongues 5, seat surface 6 and backrest 7 and which extend in the longitudinal direction of the carrier 2.

The leg tongues 5 are parallel to one another, or swung or angled away from or towards each other in the sideways direction, straight or curved in the longitudinal direction, and plane or shallowed in transverse section, and with a maximum width, common to both of them, corresponding to the apertures for the child's legs in the child seat 4 of the trolley 3. The ends and/or edges of the leg tongues 5 are also preferably slightly rounded or curved downwards so that they do not scrape against the child's heels or calves.

Figure 2:
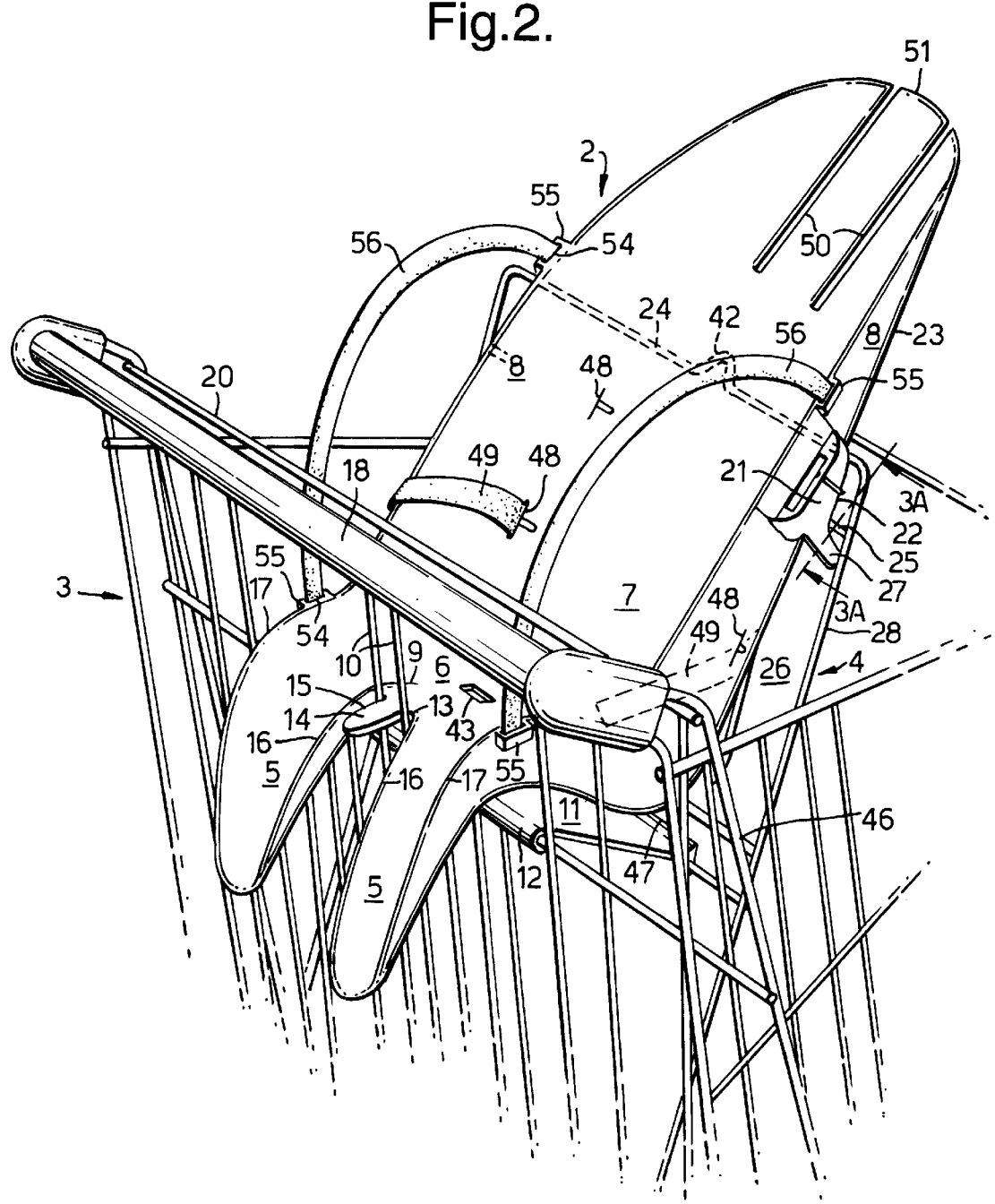
FIG. 2 is a perspective sketch of the invention according to FIG. 1 placed in the sitting position down on the child seat of a trolley.

The seat surface 6 is plane or shallowed with an arched, raised area 9 in the front central part, which raised area 9 prevents the child from sliding forwards in the carrier 2 in the sitting position (FIG. 2). The backrest 7 is plane or bucket-shaped.

Because the supports of the carrier 2 for the child's legs, i.e. the leg tongues 5, are designed divided essentially along their entire length, the carrier 2 can be used in both a reclining and in a sitting position (FIG. 1 and FIG. 2, respectively) over or, respectively, down on the child seat 4 of trolleys 3 having one or more fork bars 10 at the front edge 12 of the seat panel 11.

Arranged on the front edge 13 of the seat surface 6 there is a forwardly projecting tab 14 which narrows towards the front in the horizontal plane and is rounded at the very front, this tab 14 being placed between the leg tongues 5, and its width at the base, where it joins the front edge 13 of the seat surface 6, being smaller than the spacing between the leg tongues 5 at the front edge 13 of the seat surface 6. With a tab 14 on the carrier 2, and with the carrier 2 in the sitting position (FIG. 2), the tab 14 drops fully or partly in between two fork bars 10 above the front edge 12 of the seat panel 11. The width of the tab 14 increases from its end inwards, i.e. is conical when viewed from above. Since trolleys of different makes have different widths between the fork bars 10, the tab 14 preferably has a width at the end which is somewhat smaller than the smallest width between the fork bars. If required, the tab can then be provided with a push-on sleeve of varying thickness for the specific trolley which the buyer has invested in. The sleeve and the tab preferably have some means of locking together, for example raised areas and recesses, respectively.

In the sitting position (FIG. 2), by means of bearing against one or more fork bars 10, the front edge 13 of the seat surface 6 or the front edge or sides 15 of the tab 14 come to regulate the forward position of the carrier 2 in the child seat 4, and the inner edges 16 on the leg tongues 5, at the connection to the front edge 13 of the seat surface 6 and/or the front edge or sides 15 of the tab 14, come to stabilize the carrier 2 in the sideways direction on the child seat 4.

In the reclining position (FIG. 1), the leg tongues 5 rest against the pushbar 18 of the trolley 3 and/or against the front upper edge 20 of the goods basket 19, and in the sitting position (FIG. 2) they rest against the front edge 12 of the seat panel 11. In the sitting position (FIG. 2), the seat surface 6 rests against the seat panel 11 or is located immediately above the latter. Because the leg tongues 5 are directed downwards at the points where they bear on the front edge 12 of the seat panel 11, the carrier 2 in the sitting position (FIG. 2) tends to move forwards so as to bear against the fork bars 10 of the trolley 3.

On the outside of each side surface 8, and essentially parallel to the latter, there is a securing means 21 which reaches, via a long part of its lower edge 22, down under an imaginary plane between the securing means 21, which plane has its surface tangential to the underside 23 of the backrest 7 in the longitudinal midline of the backrest 7. In the sitting position (FIG. 2), the carrier 2 thus bears with the lower edges 22 of the securing means 21 against the upper edge 24 of the back support or against a crossbar 25 of the back support 26 which is under and parallel to the upper edge 24 of the back support.

On the lower edges 22 of the securing means 21 there is a downwardly/rearwardly projecting tongue 27 which, when the carrier 2 is in the sitting position (FIG. 2), drops into the back support 26 of the child seat 4, or which tongues 27 jointly surround the side bars 28 of the back support 26, the carrier 2 in both cases being prevented from shifting sideways in the child seat 4.

Figure 3:
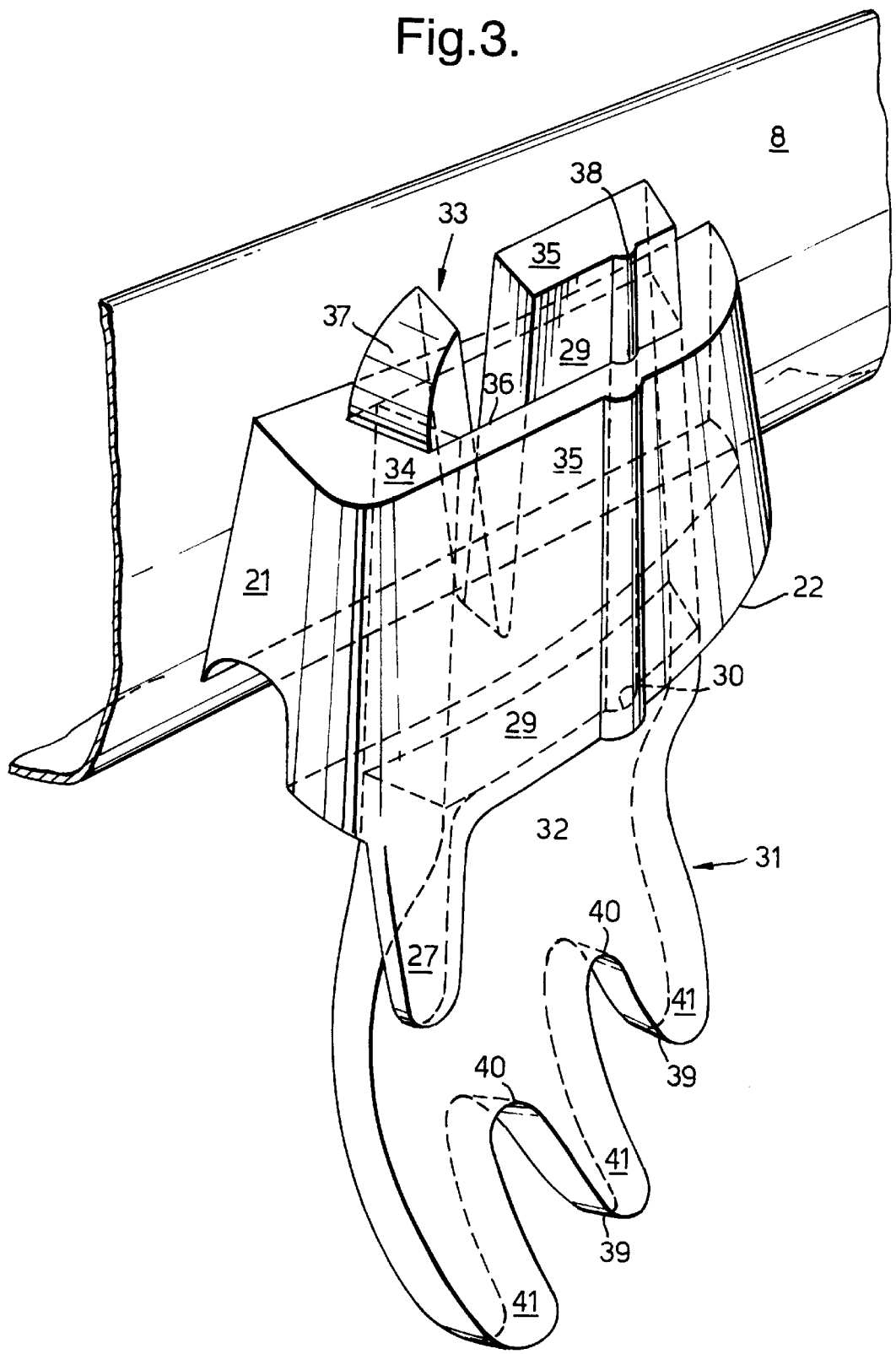
FIG. 3 is a detailed perspective view of section 3A—3A in FIGS. 1 and 2.

In the securing means 21 (FIG. 3) there is a vertical continuous cavity 29 which, in horizontal cross-section, is in the form of a truncated cone with the base towards the carrier 2. The cavity 29 is also conically shaped vertically, with the base downwards. Along the entire inner side of the cavities 29 facing away from the carrier 2 there is a guide track 30 which narrows from the bottom upwards and which is marked for the user of the carrier 2 by means of a corresponding bulge on the outer wall of the cavity 29 on the securing means 21.

In order to place the carrier 2 in the reclining position (FIG. 1), releasable, disc-shaped bearing modules 31 (FIG. 3) are pressed into the cavities 29 of the securing means 21, these modules being shaped so that their upper end fits into, fills and bottoms in the respective cavity 29 and so that they also reach right through in some areas and protrude out of the cavity 29, and with their lower module part 32 remain outside and underneath the cavity 29 and thus underneath the lower edge 22 of the securing means 21. The upper end of the bearing module 31 is divided by a deep V-shaped indent 33 into a relatively narrow stud 34, which narrows towards the top, and a broader stud 35, which studs, with the bearing module 31 introduced into the cavity 29, thus reach up to a point above the upper edge 36 of the cavity 29. The free end of the narrower stud 34 finishes with a hook 37, with the hook part directed away from the broader stud 35. At the upper end, and on the side of the broader stud 35 facing outwards when the bearing module 31 is introduced into its cavity 29, there is a narrow raised area 38.

The hook 37, the indent 33 and the raised area 38 are positioned, shaped and dimensioned in such a way that when the bearing module 31 is pressed up in its cavity 29, the hook 37 slides against the inner wall of the cavity 29, causing the narrower stud 34 to be bent resiliently against the broader stud 35 at the same time as the raised area 38 slides through the guide track 30. When the bearing module 31 bottoms in the securing means 21, the catch on the hook 37 reaches the upper edge 36 of the cavity 29, whereupon the narrower stud 34 can spring back and the hook 37 can engage over the upper edge 36 and lock the bearing module 31 in the securing means 21.

By means of the above-described conical designs of the cavity 29 and the upper part of the bearing module 31, and/or the matching of the raised area 38 to the guide track 30, the bearing modules 31 cannot be introduced into the securing means in an incorrect way.

With the bearing module 31 hooked firmly in its securing means 21, it is possible, by pressing the hook 37 towards the broader stud 35, to release the hook 37 from its engagement on the upper edge 36 of the cavity 29 so that the bearing module 31 is released and drops down out of the securing means 21.

Since the module parts 32 are designed for each respective side of the carrier 2, it is possible to imagine designing the module part 32 with more raised areas 38 on one side than on the other side and corresponding numbers of guide tracks 30 for the respective side's securing means 21. In this way, the customer cannot fit the module parts incorrectly, and this additionally shows the customer that a certain module part has to be fitted on a certain side. In addition, the raised areas on the modules can be of different colours in order to attract the customer's attention still further. It is also possible to imagine arranging some form of holder arrangement on the module parts 32, for example a piece of string or wire which is arranged at one end on the module part 32 and at the other end on its securing means 21. In this way the module parts are at all times linked to the carrier and there is then no risk of these falling off and being lost.

The lower module part 32 is either completely level with the upper part of the bearing module 31 and its narrower stud 34 and broader stud 35, or, as seen with the bearing module 31 introduced into the securing means 21, is bent inwards towards the carrier 2. The lower edge 39 of the lower module part 32 is designed with one or more deep indents 40, several indents 40 with their bottoms at different heights on the lower module part 32, and with flaps 41 surrounding them. With the bearing module 31 introduced into its securing means 21 and the carrier 2 in the reclining position (FIG. 1), one indent 40 rests against the upper edge 24 of the back support, so that at least one flap 41 is located over and behind the upper edge 24 of the back support and at least one flap 41 is located under the upper edge 24 of the back support, and so that at least one flap 41 drops into the back support 26 and thus prevents the carrier 2 from being able to slide sideways off the upper edge 24 of the back support by bearing against the side bars 28 of the backrest 26.

By choosing a suitably designed bearing module 31 with one or more indents 40, the carrier 2 in the reclining position (FIG. 1) can, on the one hand, be given a variable inclination over the child seat 4 and, on the other hand, can be raised to such a height above the upper edge 24 of the back support that the underside 23 of the backrest 7 does not bear against the upper edge 24 of the back support or on any raised parts 42 which may be present thereon.

Passing through the rear part of the seat surface 6 or the lower part of the backrest 7, or the transition between these, there is a U-shaped hooking slot 43 which is transverse to the longitudinal direction of the carrier 2 and which constitutes a securing arrangement for a securing strap 44 which is passed with one of its ends into the hooking slot 43 by means of an eyelet, and is thus releasable, and which is stretchable or fixed and is provided at its other end with one or more catches 45. With the carrier 2 in the reclining position (FIG. 1), these catches 45 can be hooked securely on the lower edge 46 of the back support 26 or the rear edge 47 or front edge 12 of the seat panel 11.

An alternative embodiment to this is to arrange the carrier with two transverse, parallel hooking slots 43 through which a securing strap 44 in the form of a VELCRO (a hook and eyelet fastening system); strap is passed, first from the bottom upwards through the one slot, down through the second slot, and then secured to a VELCRO strap arranged on the underside of the seat surface 6. The other end of the strap is arranged with successive VELCRO hooks (male parts) and VELCRO eyelets (female parts). With the carrier in the reclining position (FIG. 1), the securing strap 44 is drawn around the lower edge of the back support 26 and is joined up so that the hooks lock in the eyelets of the strap 44. In the sitting position (FIG. 2) the securing strap 44 is stretched along the underside 23 of the backrest 7 and is secured on a VELCRO strap arranged on the backrest.

On each side surface 8 or on both sides of the longitudinal line of the backrest 7 there are one or more chest strap slots 48 which run in the longitudinal direction of the carrier 2 and which act as securing points for one or more chest straps 49, for example VELCRO straps, to be joined together across the child's upper body. The chest strap slots 48 are straight and slightly narrower than the thickness of the chest straps 49 and the same length as the width of the chest straps 49, and with a U-shaped, downwardly directed widening of the slot opening, at the centre of its straight part. With this design of the chest strap slots 48, the one end of the chest straps 49, folded double in the longitudinal direction, can be passed into the U-shaped widening of the chest strap slot 48, after which the side edges of the chest straps 49 can be drawn out into and fixed in the narrower straight openings of the chest strap slot 48.

An alternative embodiment to this is for the chest strap slots 48 to be as narrow as the chest straps 49, the latter passing through their respective chest strap slots 48 and being secured with VELCRO straps on the outer side of the side surfaces 8.

At the upper end of the backrest 7 there are two parallel cushion slots 50 which run in the longitudinal direction of the backrest and which open out at the upper edge 51 of the backrest 7. A cushion 52 which is adjustable in the longitudinal direction of the backrest 7 can be arranged releasably in these cushion slots 50 of the carrier 2 by means of a strap 53 which is secured at both ends on the underside of the cushion 52. The upper side of the carrier 2 is lined with a cover designed with elastic all along its edge. The cover is folded over the edges of the carrier and is held in place by the elastic. This makes it easy to take off and wash or to dry if it has gotten wet.

At the upper edge and on the outside of each of the side surfaces 8 there are two attachments 55 provided with carrier strap slots 54 for two readily flexible carrier straps 56 which serve as lifting and carrying handles when the child in the carrier 2 is to be lifted up into the reclining position over the child seat 4 (FIG. 1) or down into the sitting position on the child seat 4 (FIG. 2). The ends of each carrier strap 56 are passed through and secured in the respective carrier strap slot 54 on the same side of the carrier 2. The carrier straps 56 are so long that the two carrying handles which they form can be bent towards each other and meet over the midline of the carrier 2. Because the carrier 2 with the child can be lifted using only one hand, the other hand is free for guiding the child's feet and legs, resting in the leg tongues 5, under the front upper edge 20 of the goods basket 19 when the carrier 2 is placed in the sitting position (FIG. 2). This makes it considerably easier to place small children in the child seats 4 of trolleys 3 before the child has learnt; or understands, how to pass his or her feet through the openings in the child seat 4 in front of the front edge 12 of the seat panel 11. The cover which is folded over the edges of the carrier ensures that when the carrier straps 56 are not being used, these are folded out to the sides so that a child placed in the carrier cannot get hold of them and, say, put them in his or her mouth.

Trolleys can conceivably be designed so that the fork bars 10 can be folded inwards towards the child seat 4 and up round an upper attachment point so that an undivided opening is created in front of the seat panel 6 of the child seat. For this type of trolley, it is conceivable, instead of having leg tongues 5, to design this part as one complete leg support with a width adapted to the opening. To hold the carrier 2 in place, the said carrier is designed, for example, with stop members on the sides, which members bear against the side edges of the opening.

Figure 4:
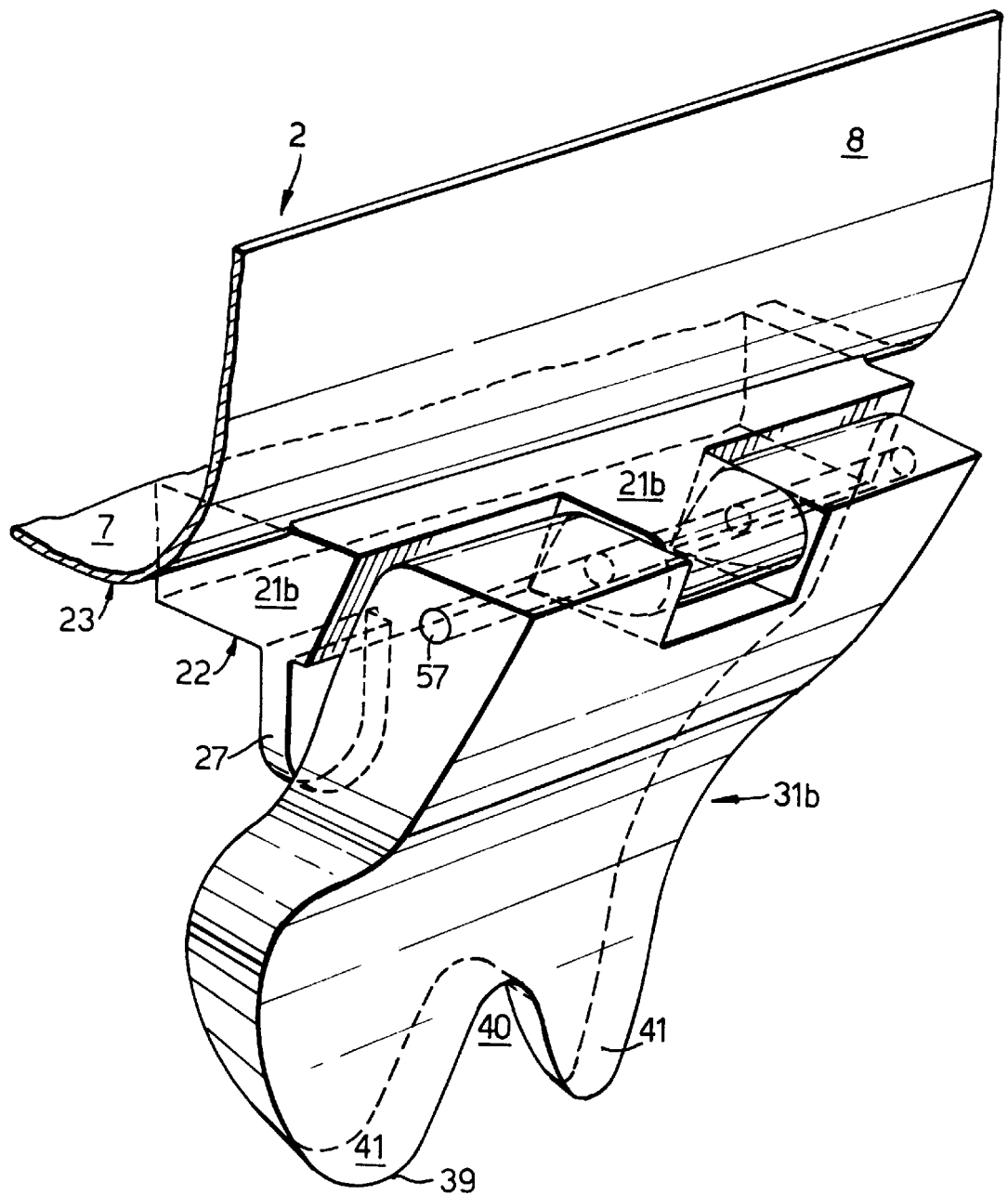
FIG. 4 is a detailed perspective view of section 3A—3A in FIGS. 1 and 2 in an alternative embodiment of this section.

As an alternative to the above-described embodiment of the invention (FIG. 4), the carrier 2 can conceivably be manufactured with a horizontal securing means 21b on the underside 23 of the backrest 7, with bearing modules 31b which are provided with flaps 41 and indents 40 which are pivotably secured on the outer ends of the securing means 21b around a shaft or pin 57.

This invention has been described with reference to its most common intended application. Variations and divergences in terms of application and design can be made without thereby departing from this invention, which is limited only by the following patent claims.

I claim:

1. A carrier for a child seat on a trolley, comprising a seat surface with a front edge, a backrest adjoining a rear edge of the seat surface, at an angle thereto, and having a rear side, two side surfaces adjoining at least one of said seat surface and backrest, at least one securing means arranged on the carrier and projecting outside a plane parallel to the rear side of the backrest, a leg support attached to the front edge of the seat surface which leg support acts as a support for a child's legs and which leg support is at an angle to said seat surface, said leg support having a width adapted to an aperture in a trolley in front of the child seat; wherein the carrier is arranged to permit being attached to the trolley with the child seat optionally in two positions, one position where the carrier is placed down on the child seat of the trolley wherein the leg support is arranged through said aperture while the securing means are in engagement with a back support of the child seat; and a second position where the carrier rests against a pushbar of the trolley and the back support of the child seat while the securing means are in engagement with the back support of the child seat.

2. Carrier according to claim 1, wherein the carrier has a raised area on a central front part of the seat surface.

3. Carrier according to claim 1, wherein it is provided with straps intended to hold a child securely in the carrier.

4. Carrier according to claim 1, wherein the carrier is provided with carrying handles.

5. Carrier according to claim 1, wherein the carrier is provided with a detachable cushioning cover.

6. Carrier according to claim 1, wherein the said side surfaces extend essentially along the entire length of the backrest, seat surface and leg supports in order to provide lateral support for the child.

7. Carrier according to claim 1, wherein the securing means are mounted on said side surfaces.

8. A carrier according to claim 1, wherein the leg support comprises two leg tongues with a spacing between the said leg tongues from the front edge of the seat surface to the end of the leg tongues, the width of the leg tongues and the spacing between them being adapted to apertures in the trolley in front of the child seat so that the leg tongues may be arranged through said apertures when the carrier is placed down on the child seat.

9. Carrier according to claim 8, wherein the space between the leg tongues on the front edge of the seat surface is provided with a tab adapted to fit into the space between fork bars of the trolley for the child seat.

10. Carrier according to claim 8, wherein said leg tongues are shallowed.

11. Carrier according to claim 10, wherein the carrier is provided with a fastening member which, together with the said securing means, holds the carrier securely when the carrier is arranged on the trolley.

12. Carrier according to claim 11, wherein the fastening member comprises a strap having one end arranged on the underside of the carrier, and the other end arranged with a fastening arrangement to be attached at a suitable point on the trolley.

13. Carrier according to claim 10, wherein the securing means comprises tongues which project behind a plane parallel to the rear side of the backrest of the carrier, wherein side surfaces of the said tongues are separated by a distance corresponding to a distance between vertical outer bars of the back support of the child seat, and wherein the securing means are placed on the carrier and comprise rearwardly directed bearing surfaces such that the carrier is prevented from shifting sideways and bears against the back support of the trolley when the carrier is placed down on the child seat of the trolley.

14. Carrier according to claim 13, wherein the securing means also comprise releasable or movable bearing modules, which bearing modules take the form of a number of flaps with indents between them, and wherein external side surfaces of the flaps are separated by a distance corresponding to the distance between inner edges of the vertical outer bars of the back support of the child seat so that the carrier is prevented from shifting sideways when it is placed with the leg tongues on the trolley pushbar, and arranged with the indents of the bearing modules on the upper edge of the back support of the child seat.

* * * * *